J. A. MAKER.
FILM SPOOL HOLDING MECHANISM FOR PHOTOGRAPHIC APPARATUS.
APPLICATION FILED OCT. 27, 1915.
1,214,936.  Patented Feb. 6, 1917.
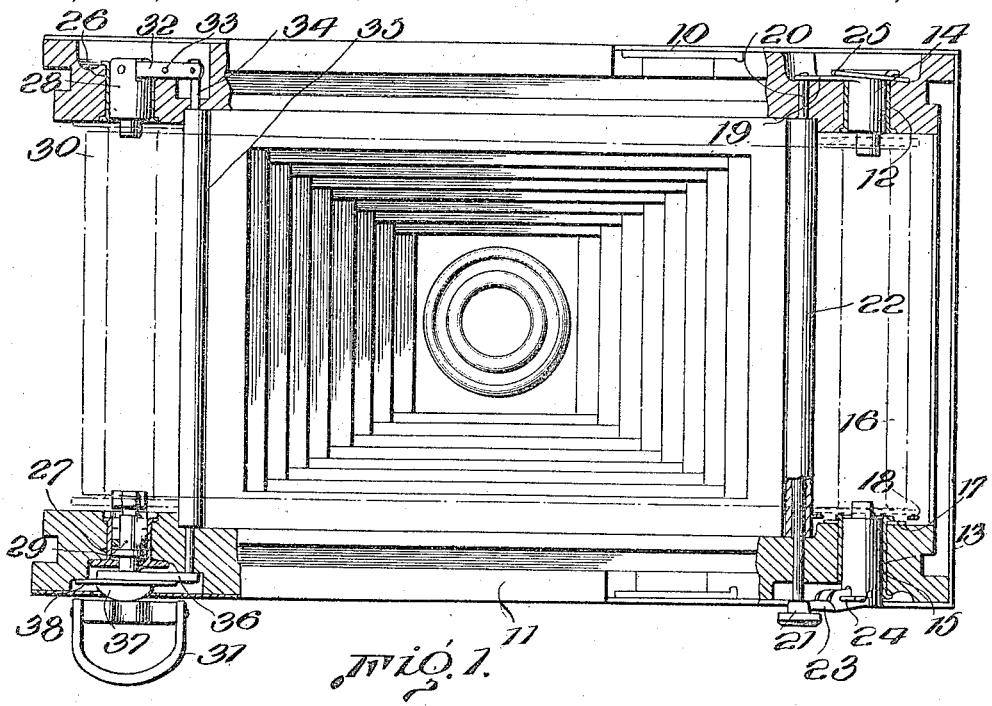
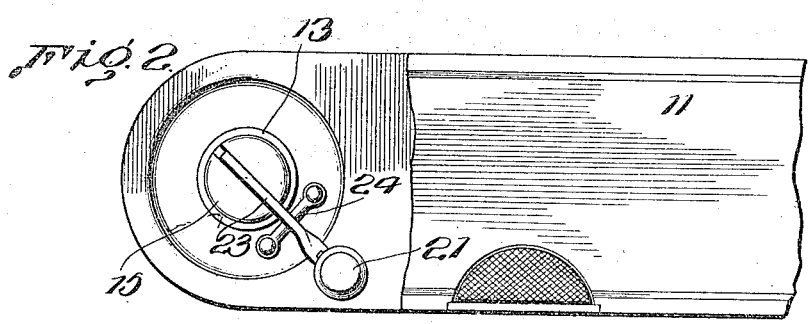
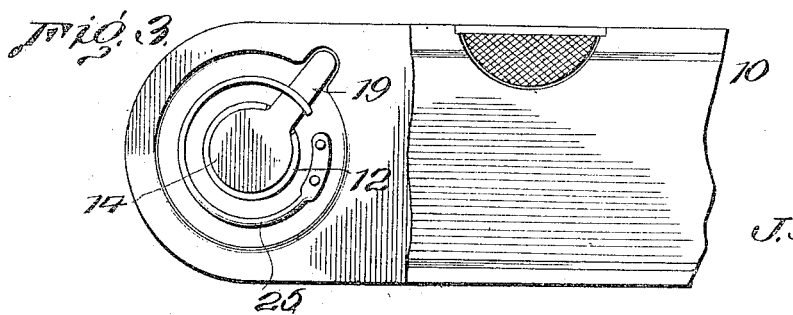
Inventor
J. A. Maker

UNITED STATES PATENT OFFICE.

JOHN A. MAKER, OF DULUTH, MINNESOTA.

FILM-SPOOL-HOLDING MECHANISM FOR PHOTOGRAPHIC APPARATUS.

1,214,936.  Specification of Letters Patent.  Patented Feb. 6, 1917.

Application filed October 27, 1915.  Serial No. 58,196.

*To all whom it may concern:*

Be it known that I, JOHN A. MAKER, a citizen of the United States, residing at Duluth, in the county of St. Louis and State of Minnesota, have invented certain new and useful Improvements in Film-Spool-Holding Mechanism for Photographic Apparatus, of which the following is a specification.

This invention contemplates an improved spool holding mechanism for photographic apparatus, being particularly adapted for use in connection with that type of camera employing a film which is wound from a full spool at one side of the exposure chamber across the exposure chamber to another spool at the opposite side thereof in the well known manner.

The invention has as its primary object to provide a construction wherein the spools may be easily and quickly inserted in proper position within the camera and may, with equal facility, be removed therefrom so that the annoyance and inconvenience now commonly experienced in this regard will be eliminated.

The invention has as a further object to provide a construction of such character that the average user of a camera may readily understand the operation thereof so that a camera equipped with my improved mechanism will find favor with the prospective purchaser.

A still further object of the invention in this connection is to provide an improved mechanism which may be used in connection with any conventional type of film holding camera now in common use with the necessity of but slight structural change therein.

Other and incidental objects will appear as the description proceeds and in the drawings wherein I have illustrated the preferred embodiment of the invention and wherein similar reference characters designate corresponding parts throughout the several views.

Figure 1 is a plan view of a conventional type of folding camera with the back thereof removed and with the frame of the camera partly broken away and shown in section to illustrate the mounting of my improved spool holding mechanism upon the camera.

Fig. 2 is a fragmentary elevation of one side end of the camera partly broken away to more particularly show the mounting of one of the spool centering pins employed, and Fig. 3 is a similar view of the opposite side end of the camera illustrating the arrangement of the centering pin adapted to coact with the pin illustrated in Fig. 2 and the mounting of the spring for urging the said pins to normal position.

For convenience, I have illustrated my improved mechanism in connection with a conventional type of folding "kodak" or camera, the body portion of which is provided with longitudinally extending side members 10 and 11 respectively. As is well known, these side members in the conventional type of camera are provided with coacting spool centering devices or pins which are longitudinally shiftable upon the said side members to engage opposite ends of each of the spools. These pins are provided with caps but, nevertheless, are very difficult to shift, often causing a breaking of the finger nails of the operator not to mention other inconvenience and a loss of time. Furthermore, each pin must be operated independently from opposite sides of the body of the camera so that one hand is required to hold the spool while the other hand must be employed in the separate operations of selectively shifting the pins at the opposite ends of the spool into engagement therewith. Accordingly, the present invention aims to provide a construction wherein the coacting pins may be simultaneously operated from one side of the body of the camera to either engage or release a spool, thus making the fitting of the spools within the camera or their removal therefrom, a very simple and easy matter.

Fixed in the side members 10 and 11 upon one side of the exposure chamber of the camera are alined tubular casings 12 and 13 respectively. Slidably mounted in said casings are coacting spool centering pins 14 and 15 respectively, having their inner ends reduced and adapted to engage opposite ends of a spool 16 for rotatably supporting the spool 16 in the well known manner, the spool being shown in dotted lines in Fig. 1. Associated with the casing 13 is a plate 17 from which is struck an annular tensioning spring 18 adapted to engage one end of the spool.

Extending laterally from the outer end of the pin 14 is an arm 19 disposed within a suitable recess formed in the outer side of the member 10. Fixed to the outer end of the arm 19 is a rod 20 which extends transversely between the side members 10 and 11 and is provided at its free end with a cap or button 21. The rod 20 is shiftable longitudinally upon the said side members and is disposed substantially in a plane with the exposure field of the camera and thus provides a guide rod for the film from the spool 16. Freely mounted upon the rod 20 is a roller 22 provided to eliminate any friction upon the film. The button 21, upon one side thereof is formed with a suitable ear to which is pivotally connected the bifurcated end of a rock arm 23, as more particularly shown in Fig. 2. The rock arm 23 is disposed within a suitable recess formed in the outer side of the member 11 and is supported by a pivot rod or pintle 24. At its inner end, the arm 23 is pivotally connected to the pin 15, the outer end of the pin being bifurcated to receive the said arm. Fixed in the recess at the outer end of the casing 12 and arranged to surround the said casing, is a substantially annular spring 25, one extremity of which is secured to the member 10 and the opposite extremity thereof arranged to engage the arm 19.

It will now be observed that when the button 21 is depressed, the pin 15 will be drawn outwardly upon the side member 11 in one direction, through the medium of the rock arm 23, while the pin 14, coacting therewith, will be drawn outwardly in the opposite direction upon the side member 10 through the medium of the operating rod 20. Thus, the pins 14 and 15 will be simultaneously withdrawn from engagement with the spool 16 and against the tension of the spring 25, the said spring, as will be obvious, normally acting to urge the pins into active position. Furthermore, particular attention is directed to the fact that this simultaneous movement of the pins 14 and 15 is accomplished from one side of the camera, thus making it easily possible to insert a spool within or to remove a spool from the camera.

Mounted upon the side members 10 and 11 at the side of the exposure chamber of the camera opposite to the sleeves 12 and 13, is a similar sleeve 26 and a sleeve 27 alining therewith. Longitudinally shiftable within the sleeve 26 is a spool centering pin 28 similar to the pins 14 and 15 and similarly shiftable within the sleeve 27 is a coacting pin 29. The pin 29 is rotatable within the sleeve 27 and arranged within the said sleeve is a conventional type of ratchet mechanism adapted to permit the rotation of the pin in one direction only. At its inner end, the said pin is reduced and provided with a transversely extending member adapted to engage one end of a spool shown in dotted lines at 30, the opposite end of the spool being supported by the pin 28, which is also reduced at its inner extremity to engage with the spool. At its outer end, the pin 29 is provided with a conventional type of looped handle 31 foldable toward the side member 11 and adapted to be grasped for rotating the pin 29 and consequently turning the spool 30 to wind the film thereon from the spool 16. Owing to the stop mechanism associated with the pin 29, the said pin can be operated only to properly wind the film upon the spool 30.

The outer end of the pin 28 is bifurcated to pivotally receive one extremity of a rock arm 32 which is arranged within a suitable recess formed in the adjacent side of the member 10 and is supported by a pivot rod 33, the arm 32 and the rod 33 being similar to the arm 23 and rod 24 shown in Fig. 2 of the drawing. At its extremity opposite the pin 28, the rock arm 32 is bifurcated to pivotally receive one extremity of an operating rod 34 mounted similarly to the rod 20 and adapted to coöperate therewith in providing a guide rod for the film. Associated with the rod 34 is a roller 35 over which the film is adapted to pass.

The rod 34 is longitudinally shiftable upon the members 10 and 11 and at its extremity opposite the rock arm 32 is secured to the outer extremity of a laterally extending arm 36, the inner extremity of which rotatably receives the pin 29 and is fixed thereon against longitudinal shifting movement. The arm 36 is received within a suitable recess formed in the adjacent outer side of the member 11 and at its inner end, is preferably provided with a convex bearing portion 37 adapted to confront the transverse member of the handle 31 as more particularly shown in Fig. 1 so that the pin 29 may be readily rotated upon the said arm. Associated with the arm 36 is a spring 38 similar to the spring 25 and mounted in a like manner.

It will now be observed that while the pin 29 may be rotated to turn the spool 30, this pin may also be shifted outwardly in one direction upon the member 11 by pulling upon the handle 31. At the same time, the pin 28 will be shifted outwardly upon the member 10 in the opposite direction through the medium of the rod 34 and the rock arm 32. Thus, the said pins will be simultaneously operated to free the spool and will be normally urged into active position in engagement with the spool by the spring 38. It is to be noted that the simultaneous operation of the pins 28 and 29 is, as in the case of the pins 14 and 15, accomplished from one side of the body of the camera and preferably, the handle 31 is arranged upon the side of the camera with the button 21.

It will therefore be seen that I provide a very simple and efficient construction for the purpose set forth which may be readily applied to any conventional type of camera with the necessity of but slight structural change therein and which is of such simple character that the operation thereof may be easily understood by the average user of a camera. Furthermore, the presence of my improved mechanism upon the camera will not in the slightest detract from the appearance thereof since, in recessing the outer sides of the parts 10 and 11, any portion of the mechanism which would otherwise be exposed may be substantially covered by the commonly employed leather covering of the body of the camera.

Having thus described my invention, what I claim and desire to secure by Letters Patent is:

1. In photographic apparatus, coacting centering devices, and means rigidly connected with one of said devices and having pivotal connection with the other for simultaneously actuating the said devices to release a film spool operatively supported thereby.

2. In photographic apparatus, coacting centering devices, and means rigidly connected with one of said devices and having pivotal connection with the other for shifting the said devices in opposite directions to release a film spool operatively supported thereby.

3. In photographic apparatus, coacting centering devices, a lever associated with one of said devices, and rigid connecting means between the said lever and the other of said devices for shifting the said devices away from each other out of engagement with a film spool operatively supported thereby.

4. In photographic apparatus, coacting centering devices, means operatively connected with the said devices with the said means fixed with respect to one of said devices and movable with respect to the other for shifting the said devices to inactive position to release a film spool operatively supported thereby, and means engaging said first mentioned device and normally acting to urge the said devices to active position.

5. In photographic apparatus having side members, coacting centering devices shiftable upon the said side members, and a push rod shiftable through the said members for moving the said centering devices in opposite directions out of engagement with a film spool operatively supported thereby.

6. In photographic apparatus having an exposure field, pairs of coacting centering devices mounted upon opposite sides of said field, and means associated with each of said pairs of devices for selectively shifting the said pairs of devices to release a film spool operatively supported thereby with one of the devices of one of said pairs mounted for rotary movement.

7. In photographic apparatus, coacting centering devices, and means operatively connected with the said devices with the said means fixed with respect to one of said devices and movable with respect to the other for shifting the devices from one side of said apparatus to release a film spool operatively supported by the said devices.

8. In photographic apparatus, coacting centering devices arranged in spaced relation thereon, and means fixed with respect to one of the said devices and operatively connected to the other whereby to simultaneously shift both of the said devices to release a film spool supported by the said devices.

9. In photographic apparatus, coacting centering devices, and means operatively connected with the said devices with the said means fixed with respect to one of said devices and movable with respect to the other for shifting the devices to release a film spool operatively supported thereby with one of the said devices mounted for rotary movement.

In testimony whereof, I affix my signature.

JOHN A. MAKER. [L. S.]

Copies of this patent may be obtained for five cents each, by addressing the "Commissioner of Patents, Washington, D. C."